United States Patent [19]
Börner

[11] Patent Number: 5,083,199
[45] Date of Patent: Jan. 21, 1992

[54] AUTOSTEREOSCOPIC VIEWING DEVICE FOR CREATING THREE-DIMENSIONAL PERCEPTION OF IMAGES

[75] Inventor: Reinhard Börner, Berlin, Fed. Rep. of Germany

[73] Assignee: Heinrich-Hertz-Institut for Nachrichtentechnik Berlin GmbH, Berlin, Fed. Rep. of Germany

[21] Appl. No.: 539,799

[22] Filed: Jun. 18, 1990

[30] Foreign Application Priority Data

Jun. 23, 1989 [DE] Fed. Rep. of Germany ....... 3921061

[51] Int. Cl.[5] .......................................... H04N 13/04
[52] U.S. Cl. ....................................... 358/88; 358/91; 358/3; 354/115; 359/464; 359/458
[58] Field of Search ............... 354/115; 350/128, 130, 350/131; 358/3, 88, 89, 91, 92

[56] References Cited

U.S. PATENT DOCUMENTS 4,214,257  7/1980  Yamauchi ............................. 358/3
4,773,731  9/1988  Goldenberg et al. ............... 350/128

FOREIGN PATENT DOCUMENTS 3529819  2/1987  Fed. Rep. of Germany.
3700525  7/1988  Fed. Rep. of Germany.

OTHER PUBLICATIONS

"Zeitschrift der Tektronix GmbH, Köln," Tektronix, Jun. 1987, issue 3, pp. 1 and 4.
"Funkschau", issue 25-26/1981, pp. 60-64.
"Electronics Australia," Jul. 1982, pp. 12-14.
"IEEE-Transaction on Consumer Electronics", vol. CE-25, Feb. 1979, pp. 111-113.

*Primary Examiner*—Victor R. Kostak
*Attorney, Agent, or Firm*—Nils H. Ljungman & Associates

[57] ABSTRACT

An autostereoscopic viewing device with a flat picture screen and a pattern of cylindrical lens portions for producing three dimensional image perceptions without the need for additional optical accessories. The viewing device provides the largest possible freedom of movement of the viewer, whereby the reproduction quality is as uniform as possible and out of focus, cross-talk and other disadvantageous optical effect are greatly reduced. The procedures for making any necessary optical corrections are based on the plane parallel changeable positioning of a flat picture screen relative to an array of cylindrical lens portions. The array of cylindrical lens portions has an increasing thickness as well as a decreasing pitch width when moving from the middle to the vertical side edges. The pixel, or picture strip, size on the picture screen is a constant.

19 Claims, 6 Drawing Sheets

AUTOSTEREOSCOPIC VIEWING DEVICE FOR CREATING THREE-DIMENSIONAL PERCEPTION OF IMAGES

BACKGROUND OF THE INVENTION

1. Field of the Invention

The present invention relates to a television apparatus or the like for producing a three-dimensional perception of images with a lens having a patterned plurality of cylindrical lens portions in front of a flat picture or image screen. Partial stereo images appear on the cylindrical lens portions in a pattern of partial stereo image strips that are rastered.

2. Background Information

The present state of the art, regarding three dimensional images, can be determined by reviewing a number of publications, such U.S. Pat. No. 4,214,257, "Funkschau" Issue 25–26/1981, pages 60–64, especially pages 63 and 64, a publication relating to radio and television, "Electronica Australia," July 1982, pages 12–14, especially page 14 and "IEEE-Transaction on Consumer Electronics" volume CE-25, February 1979, pages 111–113.

As can be determined from the above-referenced publications which relate to the state of the art, the possibility of three-dimensional television has been considered for many years. The publications discuss the different optical systems for the production of stereoscopic and other three-dimensional effects from a theoretical viewpoint. Despite the fact that at least one system has already been tested practically, none of them have, at this point, achieved any degree of a breakthrough into the consumer and/or commercial market.

In the area of office communications, the prerequisites for the introduction of new systems are more favorable. For example, in the magazine "Zeitschrift der Tektronix GmbH, Köln," an in-house publication by Tektronix, June 1987, issue 3, pages 1 and 4, concerns a three dimensional stereographic work station The viewing system of this device contains a liquid crystal stereo switch ("LCSS") which displays the images, alternately, for the right eye and for the left eye, wherein the images seen by the right eye are formed by light that is of a different polarization than that of the light that forms the images for the left eye. The viewer views these images through a pair of glasses that provides a corresponding polarized lens for each eye.

SUMMARY OF THE INVENTION

In contrast to polarization type systems, the devices associate with the present invention are autostereoscopic systems. The present invention can be used in a wide range of applications, such as viewing devices for the home consumer market, as well as for commercial applications. Autostereoscopic viewing devices need not be confined to use only in conjunction with liquid crystal displays ("LCD"), plasma displays, or the like. Devices for plain view and transparent view images, with background illumination, are important for drawn, printed or photographed images. It is a prerequisite that these images, that are designed in either two or more stereo perspectives, be broken, or divided up and are interlocked, or rastered, for autostereoscopic reproduction. By employing the present invention, stationary, as well as movable, single and multi-colored images can be perceived, or viewed, autostereoscopically. To accomplish autostereoscopic viewing, flat picture screens, as well as passive elements such as projection screens and, also, active displays that can be controlled by an electric image signal, can be utilized The present invention eliminates certain problems associated with previous systems by providing an autostereoscopic system that gives the viewer as much mobility and freedom of movement, relative to the viewing screen, as is possible. The reproduction quality is typically, universally, good. Further, lack of definition, or insufficient focus due to side to side cross-view, and other disadvantageous optical effects can preferably be removed, or at least reduced preferably to a great degree.

German Laid Open Patent Application No. 35 29 819 and German Laid Open Patent Application No. 37 00 525 discuss devices that may be constructed to influence the geometry of light rays in autostereoscopic systems, according to earlier known techniques and art. A projection device for parallax-panoramagram of a picture, that is perceptible as a three dimensional image and appears on the projection screen in very large format, has a circular, horizontal cross-section plane. The device is concave, curved and has a thickness that increases toward the outside at the vertical side borders. A different effect, from that provided by the device, may be achieved through a change of the refractive indexes of the materials of the lens comprising an array of cylindrical lens portions or wherein the pitch dimension of the cylindrical lens, from the middle to both vertical side edges, is changed. However, the most advantageous, suitable method of production must be performed by taking into account special required conditions. Also, the various production technology possibilities must be carefully chosen by considering the various effects that each will have on the overall system.

The present invention provides the autostereoscopic system mentioned above, having a flat picture, or image screen and a lens having an array of cylindrical lens portions that can be moved in a direction that is orthogonal to the plane of the screen. Also, beginning from the middle and moving outwardly to both sides, each succeeding cylindrical lens portion has an increased thickness and a decreased width of pitch. Also, the array of lens portions is preferably symmetrical around the central, vertical axis of the array.

With the preferred symmetrical configuration referred to above, there is a preferred optimization of at least one and preferably both the quality of the reproduced image and a freedom of movement of the viewer. This optimal quality and freedom of movement would not generally be possible if the image, or picture, screen utilized a constant pixel distance and a lens raster having a constant pitch measurement. The laws of ray geometry, as understood by the Applicant, require, in such a case, that the pixel, or pair of picture strips, be viewed from a position that is parallel to the plane of the screen and be viewed only from one viewing point. As understood by the Applicant, it does not appear to be possible for the viewer to perceive, simultaneously, all of the pixel or picture strips, or the partial pictures that are rastered into each other.

By configuring the picture screen with a pixel raster or picture strip dimension that changes toward the side edges, one . would usually obtain only a little better optical effect. Also, one could add considerable production and technical costs, as well as other disadvantages when used, for example, for picture or image presentation as well as when used for text presentation or for editing either with or without the array of cylindrical lens portions. A three dimensional image, with good reproduction quality, would apparently be possible only in the main viewing zone.

The details explained hereafter for two channels or stereoscopical reproduction are, also, applicable for multi-channel or panoramagram reproduction. If there are more than two, for example, ten rastered pixel or picture strips per cylindrical lens and the pixel strips run in a vertical configuration, the lens will give the viewer the perception of different stereo pairs, that is, different three-dimensional perspectives, with minor differences in each. This is known as the so-called parallax panorama sterogram.

The solution, according to the present invention, preferably permits the universal use of picture or image screens. With the present invention, a constant pixel, or picture strip raster dimension of a flat picture screen is typically employed.

Both the changing thickness of each cylindrical lens portion and the changing lens pitch occur as one moves along the horizontal direction of the lens. The fairly small adjustable air gap between the screen and the cylindrical lens portions preferably results in the desired tuning of the lens raster, as opposed to the pixel or picture strip raster of the screen due to the viewer's position. To insure that suitable optical corrections, as per the invention, are within a surveyable periphery, the flat screen should preferably always be formed with a flat picture surface and should preferably have a constant picture strip raster measurement or dimension.

Under a preferred embodiment of the present invention, at least two arrays of cylindrical lens portions may be used in conjunction with a reproduction device with a flat picture or image screen, whereby the cylindrical lens portions are used as a set, for example, for close range and long range viewing or, also, for a two- or multi-channel autostereoscopic reproduction and, also, for embodiments that differ from each other in the thickness and pitch measurements, or dimensions. The individual patterns of cylindrical lens portions of a set can be exchanged, as needed, for the structural conditions for steroscopic and panoramagram reproduction. Relative to close range/long range viewing, the distances from a viewer's position to the lens may differentiate considerably from each other because of the preferred configuration of cylindrical lens portions.

Another embodiment of the present invention offers increased comfort by equipping the lens with adjustable mechanical mounting supports.

With those supports, the distance between the flat picture or image screen and the array of cylindrical lens portions, as well as the positioning of the array of cylindrical lens portions in the horizontal direction, can be altered independently of each other. With that type of positioning, that is, the horizontal positioning and the alteration of the distance, the amount of movement of the array, as a rule, is relatively small and serves as a "fine tuning" for a certain viewer location or viewer distance. A further, advantageous feature of this embodiment is that the screens can be equipped with controllable, especially remotely controllable, drives for the adjustment of the mounting supports in the direction of the depth or width. The control signals may be provided by a device that works automatically and continuously detects and evaluates the position of the viewer.

A color TV display that has a flat screen may be used in configuration with the present invention, but must be constructed in a special configuration with respect to the light spots for the primary colors that represent a picture point or pixel. This problem with flat screens was apparently very insufficiently discussed in prior publications, if at all. The problem arises because the cylindrical lenses, which are preferably portions of circular cylinders, are located in front of the screen and the cylinder axis runs vertically. Therefore, the vertical picture strips are viewed as separate from each other. In the case of a color TV display where the light spots of the three primary colors, for the individual picture points, are located horizontally adjacent to each other, the cylindrical lenses that run vertically usually lead to the reception of partial images of the primary colors. However, the originally desired effect, that is, a three dimensional perception, does not usually occur.

The present invention may be used in conjunction with a standard color television. Already known picture screens (for example, "Hitachi Color TFT," Liquid Crystal Display Module, TM 16 DO1 HC) can be utilized since the light spots for the three primary colors (red, green and blue) and the primary colors which alternate by horizontal lines and their column-like assembly leads to individual picture points. On the flat screen there are red, green and blue light spots in alternate sequence that, therefore, are parallel to the axis of the cylindrical lens. The light spots are preferably associated with, in each case, the individual color picture strips that run in a vertical direction.

An electronic control for the present invention must be specially constructed, with respect to the light spots for the primary colors that, in each case, represent picture points. An advantageous arrangement of such an embodiment of the present invention can have an electronic control of the picture screen set up for a variable delay effect created by the movement, or motion, of the picture images by a few units of the raster. Based on a central delay, the reduction of the left-hand side shifting and the increase of the right-hand side shifting, within the picture strip raster dimension, can be achieved. This adjustment can be practically applied as auxiliary adjustments to the images generated by a mechanical shifting, as explained earlier, as well as to the production of a wanted pseudoscopic image, as well as to the removal of an unwanted pseudoscopic image.

BRIEF DESCRIPTION OF THE DRAWINGS

The following detailed Description of the Preferred Embodiments may be better understood when taken in conjunction with the appended drawings in which.

DESCRIPTION OF THE PREFERRED EMBODIMENTS

Figure 1:
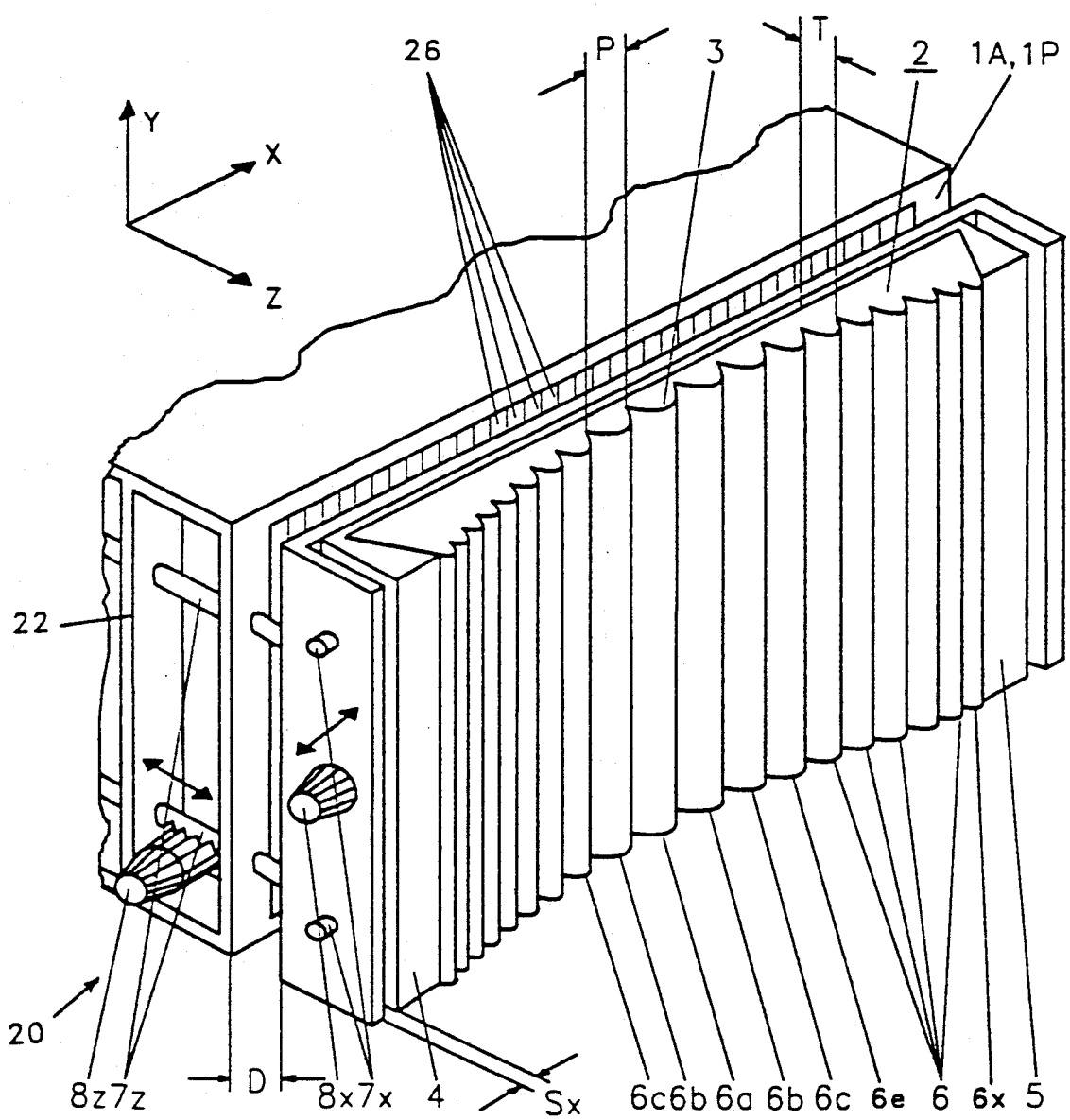
FIG. 1 is a perspective view of the present invention attached to an appropriate picture screen.

FIG. 1 shows reproduction device 20 along with three reference directions "x", "y" and "z". Reproduction device 20 is intended for three dimensional perception of images and includes a flat picture or image screen 1A or 1P, which should be contained in housing 22 and positioned in the x-y plane. Picture screen 1A, which may be an active screen, for example, may be a color television display. Picture or image screen 1P, which may be a passive screen, can display a printed, or photographically rastered, frontal view picture or translucent picture. Pairs or groups of vertically or "y" directional, picture strips 26 (described in more detail below) are adjacently positioned along the "x" direction next to one another on picture screens 1A and/or 1P. All of the picture strips 26 may have, generally, the same "x" direction width.

Figure 2:
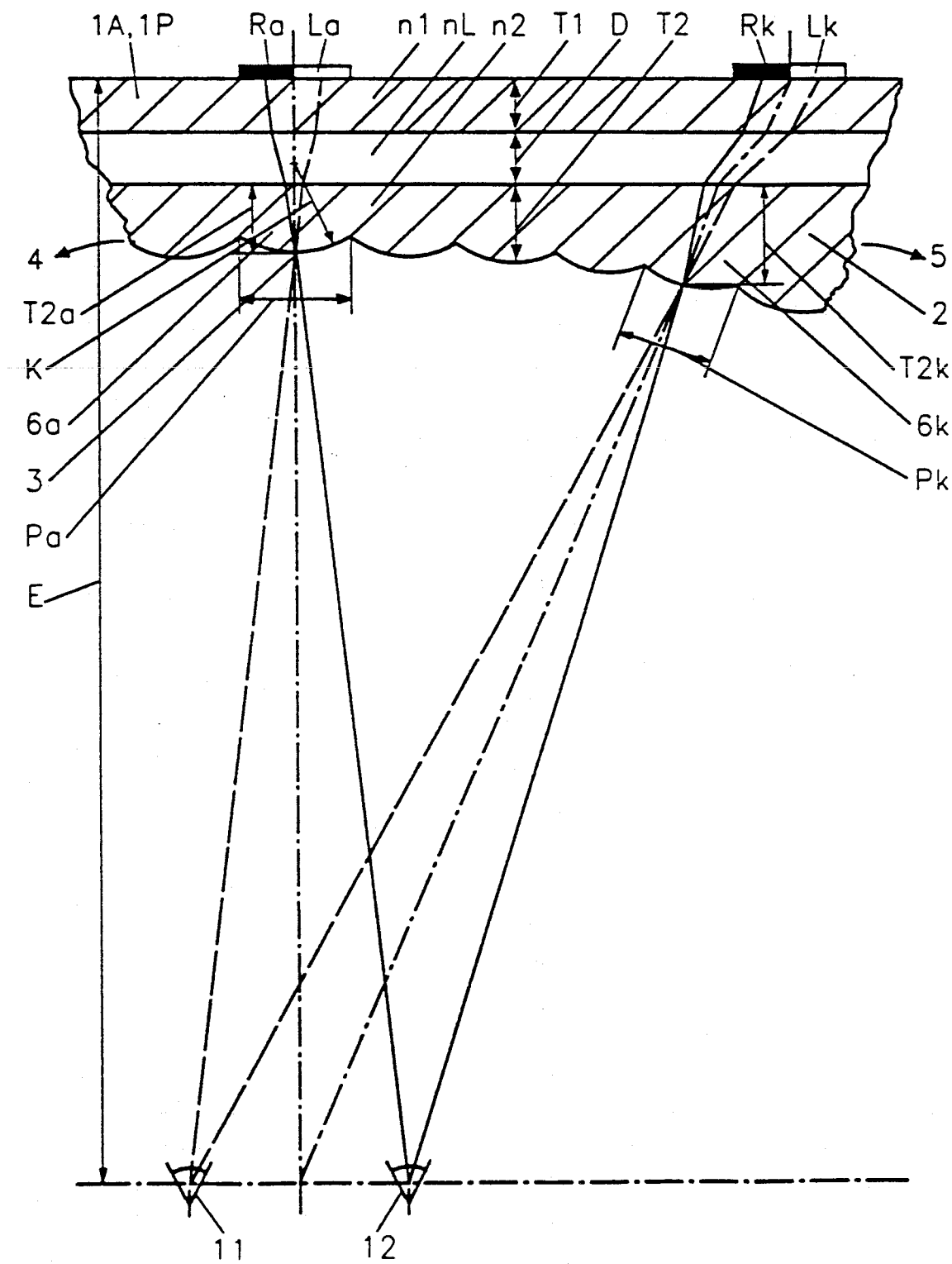
FIG. 2 is a partial top elevational view, partially in section, of the present invention along with a geometrical depiction of the path of light rays to and through the present invention.

An array, or pattern, 2 of cylindrical lens portions 6 is planned for the autostereoscopic perception of these pictures, or images. Back side 24 (as indicated in FIG. 2) of the cylindrical lens portion is, preferably, flat and positioned parallel to the picture screen 1A or 1P. Distance D is measured from the front surface of picture screen 1A and 1P to back side 24 of array 2. Array 2 is designed so that each lens portion 6 has an increasing. thickness T moving from center 3 in either direction toward the two vertical side edges 4 and 5 while, at the same time, decreases in pitch width P.

The viewing surface of array 2 presents a generally continuous contour wherein the imaginary line connecting the peaks of cylindrical lens portions 6 would be, preferably, smooth and generally concave. Cylindrical lens portions 6, such as individual cylindrical lens portions 6a and 6b, are each positioned in a vertical direction; that is, in the "y" direction. Because cylindrical lens portion 6a is in the center 3 of array 2, it has the greatest pitch width P of all cylindrical lens portions 6. Lens portions 6 become gradually smaller in pitch width, moving from center 3 toward either side edge 4 or 5. Picture strips 26 on picture screens 1A and 1P are staggered relative to the correspondingly arranged cylindrical lens portions 6. This preferred staggered arrangement, together with the increasing pitch width P of cylindrical lens portions 6 of array 2 that occurs when moving toward the side edges, permits a larger swivel, or angular, movement of the head of the viewer that is, generally, independent of lateral head movements of the viewer in the "x" direction, since the distance from picture screen 1A and 1P basically remains the same. Therefore, this combined arrangement of picture strips and cylindrical lens portions permits the perception of stereo pictures and parallax-panoramagrams with a generally consistently high reproduction quality, especially at the picture edges, or sides.

The nature of the changing thicknesses T and pitch widths P of the cylindrical lens portions 6 is illustrated with cylindrical lens portions 6a, 6b, and 6c. For example, it can be seen that central cylindrical lens portion 6a, at center 3, has the widest pitch P and smallest thickness T of all cylindrical lens portions. Moving from center 3 toward side edge 5, cylindrical lens portion 6b has a slightly narrower pitch width P and a slightly greater thickness T than central cylindrical lens portion 6a. Moving further toward side edge 5, cylindrical lens portion 6c can be seen to have a slightly narrower pitch width P and a slightly greater thickness T than 6b. This progression of decreasing pitch widths P and increasing thicknesses T of cylindrical lens portions 6 continues in succession from one lens portion to another to side edge 5. In this regard, it can be seen that cylindrical lens portion 6x has a substantially narrower pitch width P and a substantially greater thickness T than central cylindrical lens portion 6a. The same progression exists when moving from center 3 to side edge 4, as the array 2 of cylindrical lens portions 6 is symmetrical around the central, vertical axis of the array.

As one example of the decreasing pitch width of the cylindrical lens portions 6 from the center to side edges 4,5, the pitch width P of cylindrical lens portion 6a is approximately 1.125 times greater than pitch width P of cylindrical lens portion 6b. The pitch width P of cylindrical lens portion 6a is approximately 1.29 times greater than cylindrical lens portion 6e. Further, the pitch width P of cylindrical lens portion 6a is approximately 1.8 times greater than the pitch width P of cylindrical lens portion 6x. Each of these dimensions are relative and are to be taken as example only.

As one example of the increasing thickness T of the cylindrical lens portions 6 from the center to side edges 4,5, the thickness T of cylindrical lens portion 6a is approximately 0.94 times as thick as the thickness T of cylindrical lens portion 6b. The thickness T of cylindrical lens portion 6a is approximately 0.88 times as thick as the thickness T of cylindrical lens portion 6e. Further, the thickness T of cylindrical lens portion 6a is approximately 0.35 times as thick as the thickness T of cylindrical lens portion 6x. Each of these dimensions are relative and are to be taken as example only.

The distance D between picture screen 1A and 1P and array 2, can be altered in the "z" direction. By adjusting in the "z" direction, a focal adjustment may be performed within certain limitations. Array 2 can be positioned within the acceptable limit of the adjustable width Sx and in the "x" direction independently of distance D. With the above described configuration, either from a prearranged viewer position or from a panorama or moving viewing zone, optimal visible stereo pairs of images are available to a viewer. Adjustments to the relative positioning of array 2 and screen 1A and 1P may be made by depth direction holder 7z and, lateral direction holder 7x, both of which may be, for example, telescopic guidance devices, and drives 8z, 8x, both of which may that can be, advantageously, manipulated by a remote control.

A limitation may exist in the freedom of movement of the viewer in the "x" direction, relative to picture screen 1A and 1P. The movement of the viewer in the "x" direction may be made within relatively narrow limits for an array 2 of a given thickness and pitch measurement. Such a viewer distance is usually maintained on a regular basis at work stations with picture screens, anyway. The limitation of the freedom of movement in the "x" direction is somewhere between about 0.5 times and 2 times the optimal location or distance. Once the limit is exceeded, perceivable cross-talk or interference between the partial stereo pictures occurs.

For reproduction devices that are to be used in situations wherein, frequently, substantially different viewing distances are required, i.e., close range and long range viewing, corresponding arrays 2 can be arranged as a homogeneous set. The set or series of arrays 2, of such a set, need to be changed from situation to situation. For example, all arrays 2 of a series may share a common frame or each individual array 2 of a series may have its own frame with a longitudinal adjustment mounting support 7. Each array 2 of a set, of array 2 when they are used for stereo or panoramagram reproduction, differ from each other by the width of the pitch P and also possibly by the number of cylindrical lens portions 6.

It is not necessary to employ array 2 in order to use the flat picture screen 1A in a conventional manner, that is, for undistorted two dimensional picture or image reproduction as, for instance, when viewing text illustrations because the constant pixel spacing, or distance between the width of strips 26, may be used for both two-dimensional and three-dimensional viewing. The various parameters, according to the technical teachings of the present invention, also relate to optical corrections for autostereoscopic perception by array 2 and its ability to be positioned properly in relation to flat picture screen 1A or 1P.

The parameters to be considered for such optical corrections are illustrated in FIG. 2. Flat picture screens 1A and 1P preferably have a generally constant thickness T1. The pixel, or picture strips, for the stereo partial pictures Ra, La, ... Rk, Lk are located on the backside of screens 1A and 1P and have a generally constant width and a generally equal distance between each other. The material from which picture screens 1A and 1P is made, preferably, has a refractive index of n1.

Array 2 preferably has a flat back surface consisting of a material having a refractive index of n2. Array 2 is configured, moving from center 3 toward either side edge 4 or 5, so that each lens portion 6 has an increasing thickness T2, as well as a decreasing pitch width Pa, ... Pk.

Picture screen 1A and 1P and the back of array 2 are relatively positioned so that they are plane parallel to one another and separated at a distance of D. The space between screen 1A or 1P and array 2 is filled with, preferably, air, with a refractive index nL equal to 1.

E is the distance between the picture screen 1A or 1P and the viewer's eyes. The left eye of the viewer is designated by reference number 11, while the right eye is designated by reference number 12.

The path of light rays directed to picture screen 1A or 1P, as shown in FIG. 2 and located between eyes 11 and 12, and pixel pairs Ra/La and Rk/Lk were chosen as an example, to show the resulting staggered effect, or offset, generated by the portion of the light rays during the transition from one medium to another and through the overall distance that the light rays travel at any particular location in the medium. To achieve the desired optical correction for both eyes 11 and 12, the optimal assignment of the light rays is required starting at each pair of pixel or picture strips, Ra/La, ... Rk/Lk.

The various dimensions of reproduction device 20 can be freely chosen and, for example, can be determined by iterative calculations, such as, for the determination of distance D, T2a, ... T2k, and pitch width Pa, ... Pk. The calculations are based on the laws of light ray geometry for multi-lens systems, where, in this case, the system has a plane parallel surface for picture screen 1A or 1P, an air space throughout the extent of distance D and plane, convex lens portions 6a through 6k. The radius of curvature, k, is, generally, the same for all individual cylindrical lens portions 6a, ... 6k.

Figure 3:
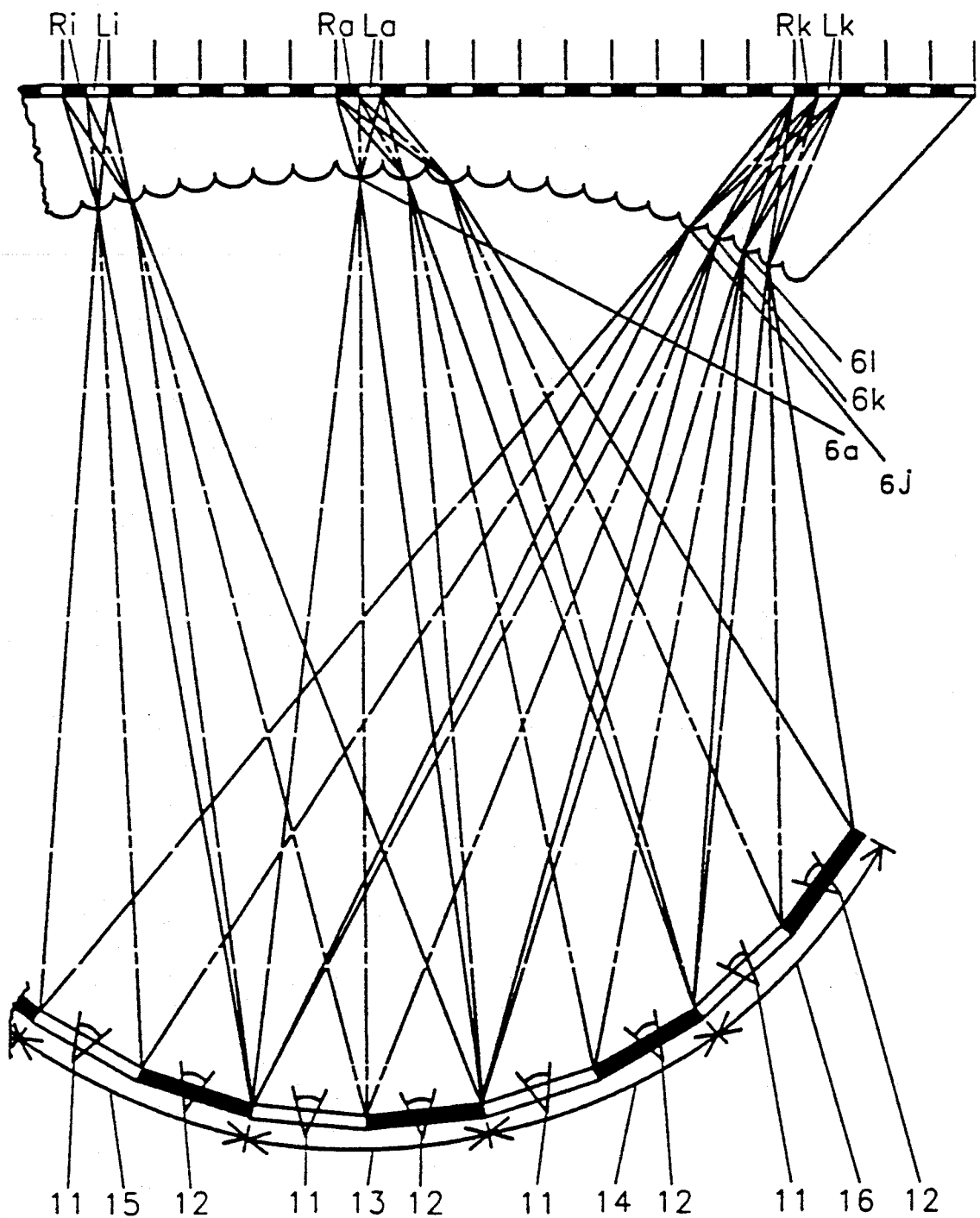
FIG. 3 is a partial top elevational view of the present invention along with a geometrical depiction of the path of light rays to and through the present invention.

As shown in FIG. 3, reproduction device 20 provides autostereoscopic perception in several viewing zones 13 through 16. This allows two or three viewers to watch an autostereoscopic picture reproduction simultaneously. One viewer, who is located in zone 13, sees the pair of pixel or picture strips Rk/Lk through lens 6K. The same pair, Rk/Lk, can be seen by viewers in adjacent zones 14 and 15 through lenses 6k+1 and 6k−1, that are located adjacent to the right, 6l, and tot he left, 6j, respectively, of lens 6k. Also, if a viewer is located at a distance of one half the viewing zone in a laterally staggered manner, then eyes 11 and 12 will perceive all stereo partial pictures as being inverted, that is, as a mirror image of Lk/Rk. This inversion effect is an inversion of the depth information and is called pseudoscopy. It was mentioned above how this effect can be influenced with active picture screen 1A, using an electronically controllable staggered arrangement of pixel or picture strips in a way that may provide an offset.

FIGS. 4–7 show an important detail of the autostereoscopic system. With a color TV display, individual light spots 9 provide the primary colors red ("r"), green ("g"), and blue ("b"), that are arranged within picture point 10 on flat picture screen 1A and must be vertically adjacent to each other. Such a picture point 10, as in FIG. 4 for example, is highlighted by a shaded area. 0 therwise, the primary color picture strips could be viewed through the cylindrical lens portions which are placed before the screen.

This, furthermore, means that with a pixel size of 0.3 mm, which is commonly available in the trade, the width of a stereo picture strip pair R and L is preferably only 0.6 mm, so that horizontal resolution, and definition, and a correspondingly good depth effect is possible.

Figure 4:
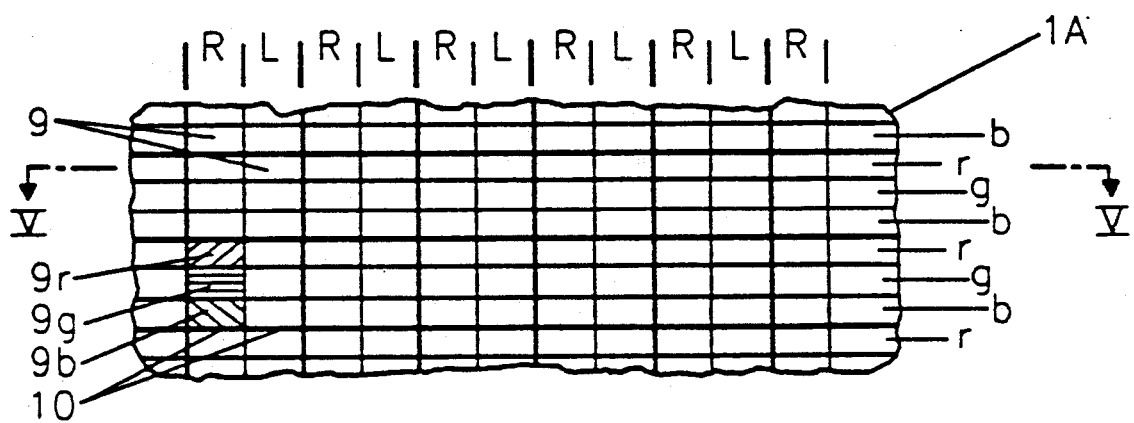
FIG. 4 is a partial front elevational view of a flat picture screen.

The portion of picture screen 1A, as illustrated in FIG. 4, comprises a matrix of light spots 9 and has vertically running stereo partial picture strips R and L, that comprise picture points 10. Each picture point 10 comprises one each of light spots $9r$, $9g$ and $9b$. Light spots 9, of the same primary color, are located horizontally adjacent to each other.

Figure 5:
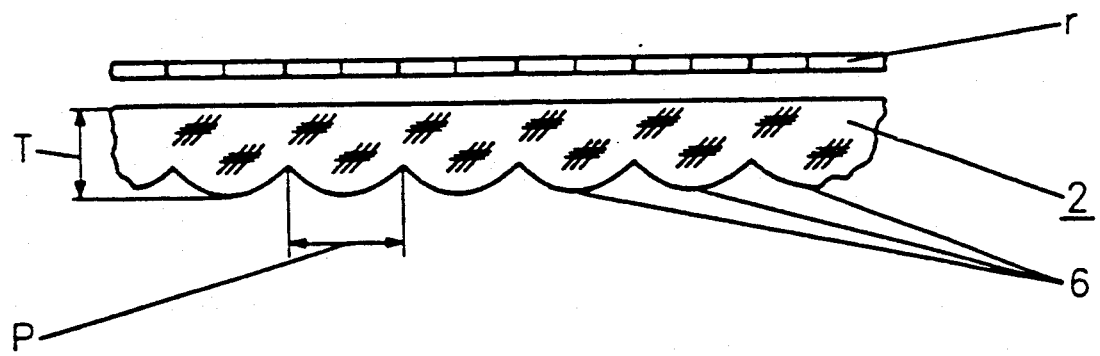
FIG. 5 is a top sectional view of the screen of FIG. 4, taken along line V—V, and relatively positioned with respect to the present invention.

As shown in FIG. 5, cylindrical lens 6 is attached to each stereo partial picture strip pair, R and L, of cylindrical lens portions 2. In contrast to that, FIGS. 6 and 7 show the relative positioning of one stereo partial picture strip group, comprising four picture strips, relative to each cylindrical lens portion 6.

Figure 6:
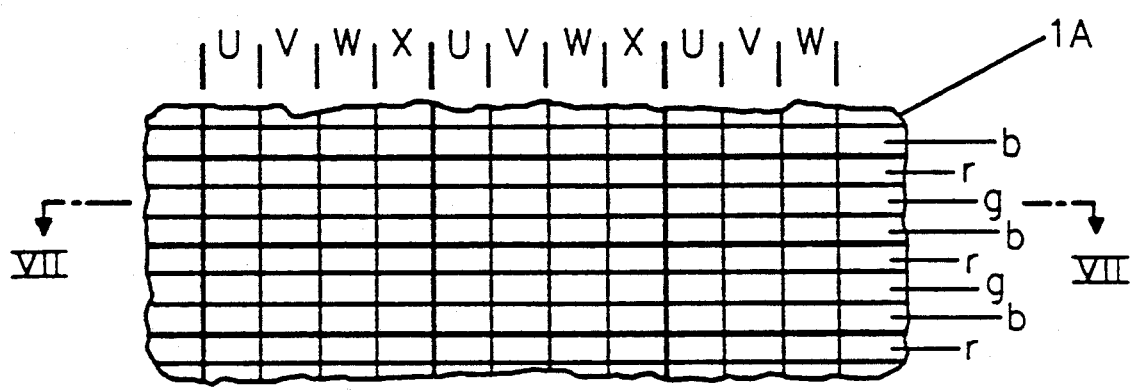
FIG. 6 is a partial front elevational view of a picture screen adapted to display a parallax-panoramagram when used in conjunction with the claimed invention.
Figure 7:
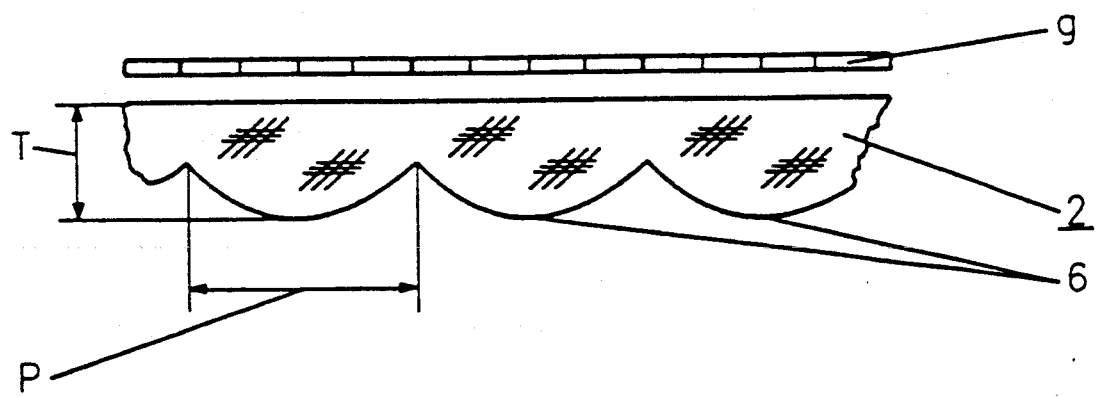
FIG. 7 is a top sectional view of the screen of FIG. 6, taken along line VII—VII, and relatively positioned with respect to the claimed invention.
Figure 8:
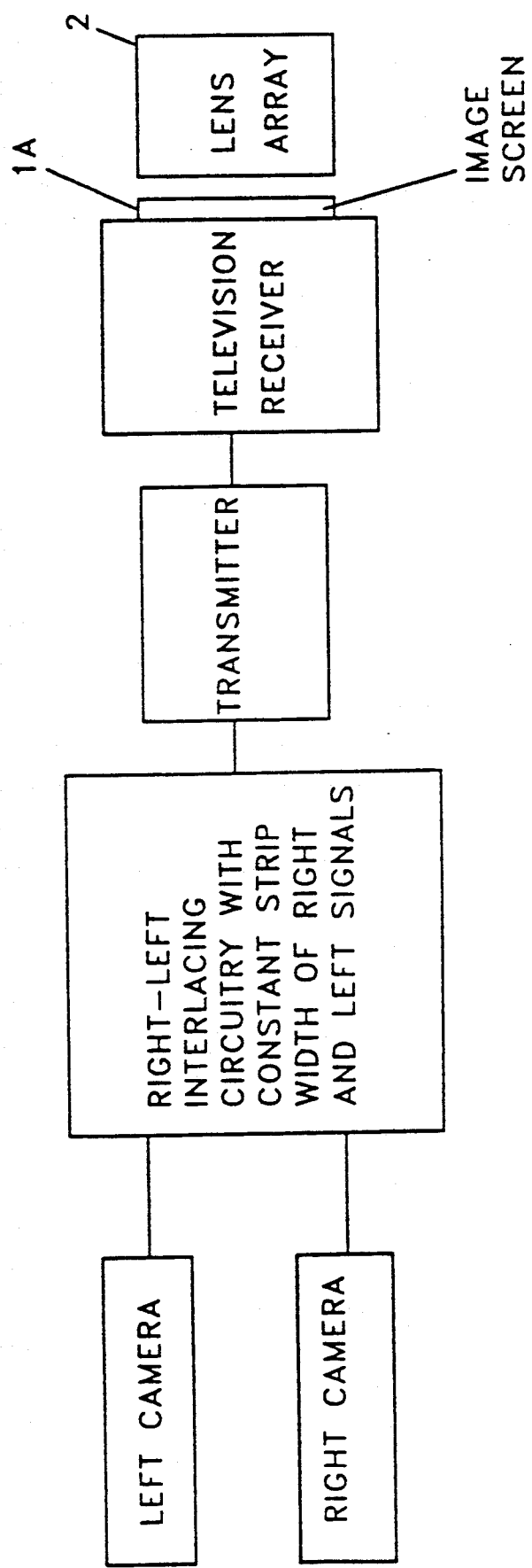
FIG. 8 is a television system according to the invention.

FIGS. 6 and 7 show an embodiment of reproduction device 20 for the display of parallax-panoramagrams. FIGS. 6 and 7 show an example with four partial picture strips U, V, W and X. From a first position, a viewer can see the stereo picture perspectives U/V, V/W and W/X. From a shorter distance, perspectives U/W and V/X are visible, while from a yet shorter distance, the perspective of U/X is visible. This set of relationships between picture perspectives and distance corresponds exactly to natural depth perception, that is, the shorter the distance between the viewer and the object, the greater the depth perception effect. FIG. 8 shows a two-channel television system, the most simple performance of a multi-channel system according to the invention. This two-channel autostereoscopic television system has two cameras for individually and simultaneously recording both the right and left views of an image. The signals from each of the cameras are then combined by interlacing circuitry that provides a constant strip width for the right and left camera signals. The combined and interlaced signals are sent by means of a transmitter to a television receiver which processes the signals and displays them on the image screen 1A. Lens array 2, positioned adjacent the image screen 1A then allows a viewer to perceive the projected image in a three-dimensional manner.

In summary, one feature of the invention resides broadly in the reproduction device for three-dimensional perception of pictures, whereby a cylindrical lens scan pattern is in front of a flat picture screen. On the reproduction device, partial stereo images appear which are interlaced with a constant width of strips. The reproduction device is characterized by the fact that, in front of the device, an arrangement of a flat picture screen 1A, 1P and a cylindrical lens scan pattern 2 is positioned so that the picture screen and lens scan pattern can be altered in a plane parallel fashion in relation to each other. The reproduction device is also characterized by the means of a development of a cylindrical lens scanning pattern 2 from the middle 3 to both outer edges 4 and 5 comprising increasing thickness T of plate 2 as well as decreasing pitch width P of cylindrical lenses 6.

Another feature of the invention resides broadly in the reproduction device which is characterized by at least two cylindrical lens portions 2 which differentiate themselves as a set by different construction in reference to their thickness T and pitch P measurements.

Yet another feature of the invention resides broadly in the reproduction device which is characterized by an adjustable depth adjustment mounting support 7z with which the distance D between the flat picture screen 1A, 1P and the cylindrical lens scan pattern 2 can be altered.

A further feature of the invention resides broadly in the reproduction device which is characterized by an adjustable latitudinal mounting support 7z with which the positioning Sx of the cylindrical lens portions 2 can be changed in a horizontal direction, parallel to the flat picture screen 1A, 1P.

A yet further feature of the invention resides broadly in the reproduction device which is characterized by controllable drives 8z, 8x for the adjustment of the mounting supports 7z, 7x.

Yet another feature of the invention resides broadly in the reproduction device which is characterized by the fact that the known picture screen 1A has an arrangement of light spots 9 for the three primary colors (red, green, blue), which, in their concentration, with the alternately line-wise primary colors and their column-wise concentration, leads to single image elements 10.

An additional feature of the invention resides broadly in the reproduction device which is characterized by one electronic control of the image screen 1A, the arrangement for a changeable delay effected by the lateral shift of the picture by few units of the raster.

Other features of the invention include an autostereoscopic system with a flat picture image screen and a pattern of cylindrical lens portions, is intended to offer the largest possible freedom of movement of the viewer, whereby the reproduction quality is as uniform as possible and focusing problems, cross-talk and other disadvantageous optical effects are excluded to a great extent.

The measures for the optical correction are based on a plane parallel changeable positioning of flat picture image screen 1A, 1P and pattern of cylindrical lens portions 2, whereby the pattern of cylindrical lens portions Z displays an increasing thickness T as well as a decreasing pitch width P of each cylinder lens 6, from the middle 3 to the two vertical side edges 4 and 5, and whereby the pixel or picture strip distance on the picture image screen 1A, 1P remains constant.

Three dimensional picture image perceptions are provided without additional optical accessories.

Some examples of three-dimensional television can be found in U.S. Pat. No. 4,819,064, entitled "Television Monitor Field Shifter and an Opto-Electronic Method for Obtaining a Stereo Image of Optimal Depth Resolution and Reduced Depth Distortion on a Single Screen"; U.S. Pat. No. 4,504,856, entitled "Stereo Television System"; U.S. Pat. No. 4,734,756, entitled "Stereoscopic Television System"; U.S. Pat. No. 4,601,053, entitled "Automatic TV Ranging System"; U.S. Pat. No. 4,418,993, entitled "Stereoscopic Zoom Lens System for Three-Dimensional Motion Pictures and Television"; U.S. Pat. No. 4,286,286, entitled "Photo Controlled Stereoscopic Television System"; U.S. Pat. No. 4,236,172, entitled "Stereoscopic Color Television" and U.S. Pat. No. 4,175,269, entitled "Underwater TV Surveillance of Pipelines."

All, or substantially all, of the components and methods of the various embodiments may be used with at least one embodiment or all of the embodiments, if any, described herein.

All of the patents, patent applications, and publications recited herein, if any, are hereby incorporated by reference as if set forth in their entirety herein.

The details in the patents, patent applications, and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. Television apparatus for creating a three dimensional image of pictures from television images, said television apparatus comprising:
   image screen means for displaying a plurality of visually distinct image segments containing three dimensional information on parallelly disposed elongated strips having substantially mutually parallel longitudinal axes;
   lens means for being relatively positioned adjacent said image screen means, said lens means used for viewing said image segments therethrough;
   said lens means defining an axis;
   said axis of said lens means having a first end, a second end and a center;
   said lens means comprising a plurality of lens segments for being in registration with said image segments, each said lens segment defining at least one curved surface;
   said lens segments each having a longitudinal axis that is generally perpendicular to said axis of said lens means and generally parallel to the longitudinal axes of said elongated strips;

said lens segments each being juxtaposed adjacent to at least one other said lens segment;

said lens segments each defining a maximum thickness;

said maximum thickness of each said lens segment being measured in a direction that is generally orthogonal to both said axis of said lens means and said longitudinal axis of said lens segment; and said maximum thickness of each consecutive lens segment from said center of said axis of said lens means of each said lens segment:

increasing in the direction from said center of said axis of said lens means to said first end of said axis of said lens means; and increasing in the direction from said center of said axis of said lens means to said second end of said axis of said lens means.

2. The apparatus of claim 1, further including lens positioning means for altering the relative position of said image screen means and said lens means.

3. The apparatus of claim 3, wherein said lens positioning means alters the separation between said image screen means and said lens means.

4. The apparatus of claim 3, wherein said lens positioning means alters the relative lateral positioning of said image screen means and said lens means.

5. The apparatus of claim 4, wherein said lens positioning means includes power drive means for altering the relative position of said image screen means and said lens means.

6. The apparatus of claim 5, wherein each said image segment comprises a plurality of red, green and blue light spots for creating a visual image, wherein the three primary colors alternate by horizontal lines and each individual color light spot is arranged column-like.

7. The apparatus of claim 6, wherein said alteration of said relative lateral positioning of said image screen means and said lens means effectuates a variable delay effect whereby the images of said image segments are displaced by a few units of the raster.

8. The apparatus of claim 7, wherein:

said lens segment each defining a maximum width;

said maximum width of each lens segment being measured in a direction that is generally parallel to said axis of said lens means and orthogonal to said longitudinal axis of said lens segment; and said maximum width of each said lens segment;

decreasing in the direction from said center of said axis of said lens means to said first end of said axis of said lens means; and decreasing in the direction from said center of said axis of said lens means to said second end of said axis of said lens means.

9. The apparatus of claim 8, wherein:

said image screen means comprise a flat picture screen surface for being disposed adjacent said lens means;

said elongated strips are interlaced;

said elongated strips have a constant width;

said lens means having a flat surface disposed adjacent said flat picture screen;

said flat picture screen and said surface of said lens means are parallel to one another; and said lens segments being portions of circular cylinders.

10. Apparatus for creating a three dimensional image of pictures, said apparatus comprising:

image screen means for displaying a plurality of visually distinct image segments;

lens means for being relatively positioned adjacent said image screen means, said lens means for viewing said image segments therethrough;

said lens means defining an axis;

said axis of said lens means having a first end, a second end and a center;

said lens means comprising a plurality of lens segments for being in registration with said image segments;

said lens segments each having a longitudinal axis that is generally perpendicular to said axis of said lens means;

said lens segments each being juxtaposed adjacent to at least one other lens segment;

said lens segments each defining a maximum width;

said maximum width of each lens segment being measured in a direction that is generally parallel to said axis of said lens means and orthogonal to said longitudinal axis of said lens segment; and said maximum width of each said lens segment;

decreasing in the direction from said center of said axis of said lens means to said first end of said axis of said lens means; and decreasing in the direction from said center of said axis of said lens means to said second end of said axis of said lens means.

11. The apparatus of claim 10, wherein each said lens segment defines at least one curved surface.

12. The apparatus of claim 11, further including lens positioning means for altering the relative position of said image screen means and said lens means.

13. The apparatus of claim 12, wherein said lens positioning means alters the separation between said image screen means and said lens means.

14. The apparatus of claim 13, wherein said lens positioning means alters the relative lateral positioning of said image screen means and said lens means.

15. The apparatus of claim 14, wherein said lens positioning means includes power drive means for altering the relative position of said image screen means and said lens means.

16. The apparatus of claim 15, wherein each said image segment comprises a plurality of red, green and blue light spots for creating a visual image wherein the three primary colors alternate by horizontal likes and each individual color light spot is arranged column-like.

17. The apparatus of claim 16, wherein said alteration of said relative lateral positioning of said image screen means and said lens means effectuates a variable delay effect whereby the images of said image segments are displaced by a few units of the raster.

18. The apparatus of claim 17, wherein:

said lens segments each defining a maximum thickness;

said maximum thickness of each lens segment being measured in a direction that is generally orthogonal to both said axis of said lens means and said longitudinal axis of said lens segment; and said maximum thickness of each said lens segment;

increasing in the direction from said center of said axis of said lens means to said first end of said axis of said lens means; and increasing in the direction from said center of said axis of said lens means to said second end of said axis of said lens means.

19. Apparatus for creating a three dimensional image of pictures, said apparatus comprising:
   image screen means for displaying a plurality of visually distinct image segments;
   lens means for being relatively positioned adjacent said image screen means, said lens means for viewing said image segments therethrough;
   said lens means defining an axis;
   said axis of said lens means having a first end, a second end and a center;
   said lens means comprising a plurality of lens segments for being in registration with said image segments;
   said lens segment each having a longitudinal axis that is generally perpendicular to said axis of said lens means;
   said lens segments each being juxtaposed adjacent to at least one other lens segment;
   said lens segments each defining a maximum thickness;
   said maximum thickness of each said lens segment being measured in a direction that is generally orthogonal to both said axis of said lens means and said longitudinal axis of said lens segment;
   said maximum thickness of each said lens segment:
      increasing in the direction from said center of said axis of said lens means to said first end of said axis of said lens means; and
      increasing in the direction from said center of said axis of said lens means to said second end of said axis of said lens means;
   said lens means;
   said lens segments each defining a maximum width;
   said maximum width of each said lens segment being measured in a direction that is generally parallel to said axis of said lens means and orthogonal to said longitudinal axis of said lens segment; and
   said maximum width of each said lens segment:
      decreasing in the direction from said center of said axis of said lens means to said first end of said axis of said lens means; and
      decreasing in the direction from said center of said axis of said lens means to said second end of said axis of said lens means.

* * * * *